Aug. 31, 1948.                    R. F. GRIECO                    2,448,309
                           THREADING TOOL GRINDING FIXTURE
                                Filed June 12, 1945
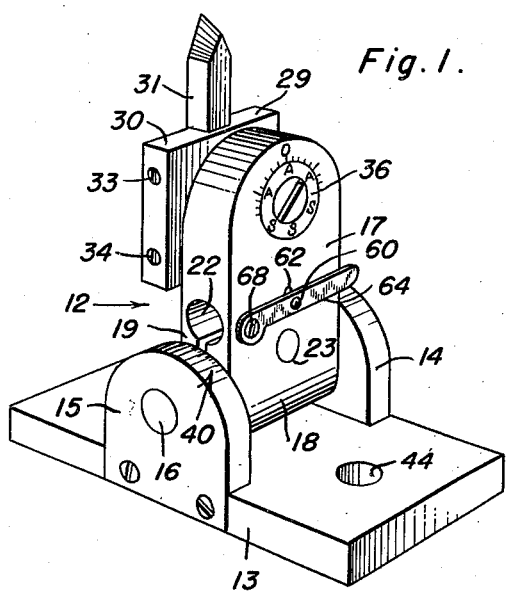
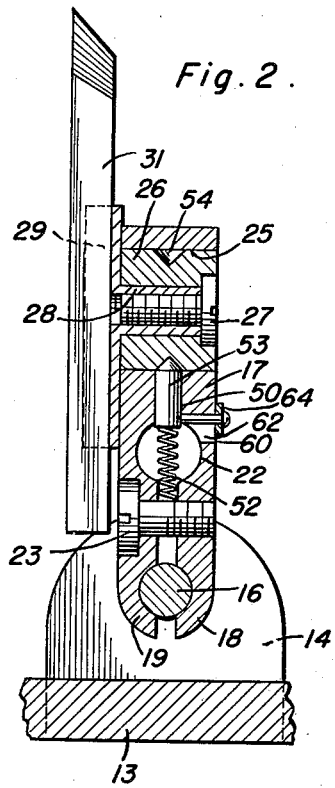
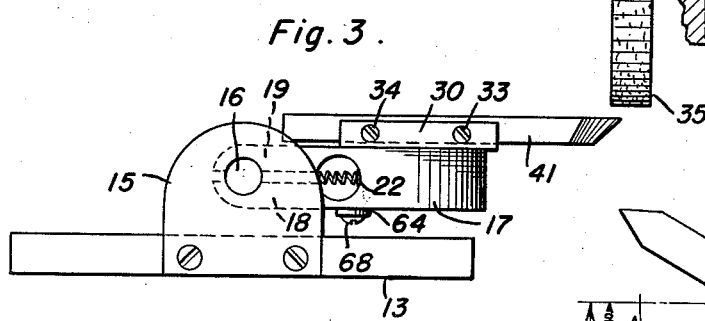
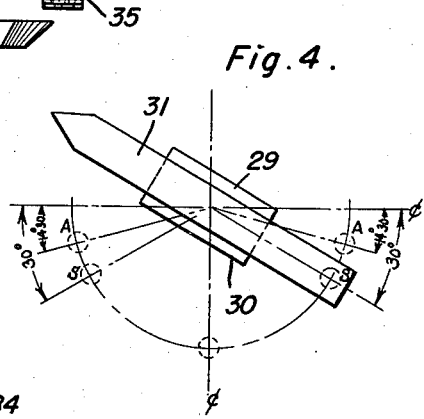
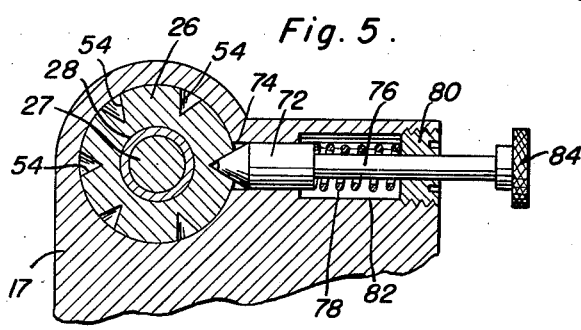
Rocco F. Grieco
   INVENTOR.

Patented Aug. 31, 1948

2,448,309

UNITED STATES PATENT OFFICE 2,448,309

THREADING TOOL GRINDING FIXTURE

Rocco F. Grieco, Millburn, N. J.

Application June 12, 1945, Serial No. 599,022

4 Claims. (Cl. 51—220)

This invention relates to threading tools and has for its object to provide means for holding a threading tool bit in exact position for grinding the same for precision work.

Another object of the invention is to provide a tool holder having a tilting table and means for indicating the exact angle at which a tool is to be ground.

A further object of the invention is to provide a bit holder arranged to hold the bit in precise position for grinding the same to cut threads for V-sharp, standard (60°) and Acme (29°), on a surface or other grinding machine which would give the same result.

Other features and advantages will become more readily apparent from the following description and the accompanying illustrative drawings in which:

Figure 1 is a perspective view of one form of the invention;

Figure 2 is a sectional view of the device shown in Figure 1;

Figure 3 is an elevational view showing the device in Figure 1 in an adjusted position;

Figure 4 is a diagrammatic elevational view indicating varying angles of tool clamp adjustment; and Figure 5 is a fragmentary sectional view illustrating a second form of the invention.

The first form of the invention generally indicated at 12 may be seen best in Figures 1 and 2. A substantially flat base 13 is provided with bearing brackets 14 and 15, respectively. The said brackets 14 and 15 are attached by any suitable conventional means such as the screws illustrated.

Fixedly mounted in the bearing brackets 14 and 15, respectively, is a pintle 16, upon which a bearing block 17 is pivotally secured. The said bearing block 17 is preferably secured to the pintle through the utility of a pair of jaws 18 and 19 formed by slitting the block at its lower end and reaming the block to form bearings for engagement with the said pintle 16.

The tilting block 17 is so slit as to permit a slight resiliency between the jaws 18 and 19 whereby, through the medium of the tension screw 23, the jaws may be caused to fixedly grip the said pintle 16. Of course, the screw 23 extends through the jaws 18 and 19 and also is anchored fixedly (relative to the other jaw) through the medium of screw threads.

A bore 25 is formed in the upper end of the block 17 and a collar 26 is rotatably mounted therein. Extending within the central bore of the said collar 26 is a pivot member 28 having jaws 29 and 30 associated therewith. A screw 27 is countersunk in the collar 26 and threadedly secured to the said pivot member 28.

The said jaws 29 and 30 are so spaced as to accommodate a shank 31 which is a portion of a tool. Set screws 33 and 34 may be provided in the said jaw 30 for frictional engagement with the shank 31, in anchoring the same.

One rim 36 of the said collar 26 is exposed to view on one surface of the said block 17. Suitable indicia are supplied on the said exposed rim 36 for cooperation with complemental indicia on the tilting block 17. By turning the said collar 26 (using the bit or tool 31 as a crank), in order to bring the indicia into alignment with the complemental indicia, the tool may be brought to any desired angle relative to a grinding wheel 35 (see Fig. 3).

Inspection of Figure 1 discloses indicia on the bearing bracket 15 which is cooperative with suitable indicia on one edge of the said tilting block 17. Through utility of this indicia, the block 17 may be tilted to a desired, known angle in bringing the end of the tool 31 to a predetermined position relative to the grinder 35.

A bore or other suitable aperture 44 may be supplied in the base 13 in order to clampingly engage the said base in a desired position relative to a table or other suitable datum to perform specific cutting operations.

The clearance of a thread-cutting bit (front or side clearance) may be determined by the diameter and pitch of a screw to be cut, which clearance is obtained by the position of the tilting block 17, which takes its angular reading from the indicia generally indicated at 40. The angle of the thread cutter bit may be obtained by the rotary adjustment of bit 31 about the axis of collar 26.

Referring now primarily to Figure 2, the first form of the invention is illustrated in detail. This species of the invention illustrates the first means for fixing the collar 26 in a set position. The said collar 26 is provided with a plurality of notches 54 about the periphery thereof which notches are cooperative with a pin 53.

The said split tilting block 17 is provided with a bore 50 extending axially thereof. The said bore 50 also accommodates a pin 53 which cooperates with the said notches 54 as mentioned above. Further, the counterbore 22 which is provided substantially parallel to the bearing-forming bore on the said pintle 16 communicates with the slit in the tilting block 17. A spring 22 seats on the said screw 23 and bears against the said pin 53, normally urging the same into operative engagement with the periphery of the said collar 26. Of course, the machined edge of the said pin 53 is adapted to seat in the said notches 54 which are of complemental shape. Through this expedient, the collar 26 may be held against rotation relative to the tilting block 17.

The said pin 53 is provided with an arm 60 which is operative in a slot 62. The said slot is formed in the said tilting block 17 (see Fig. 2) in order to limit the travel of the said pin. A rod 64 is pivoted to the outer surface of the said tilting block 17 through the medium of a conventional screw or the like 68. This rod also has the arm 60 secured thereto, whereby, upon actuation of the rod 64, the pin 50 will be selectively raised and resiliently returned.

Referring now to the embodiment of the invention shown in Figure 5, it will be seen that a pin 72 is supplied in the bore 74. Of course, the collar 26 is identical in this species as is the plurality of notches 54. The said pin 72 is adapted to seat in selective notches 54 for locking purposes. An arm 76 is secured to the said pin 72 and is normally resiliently biased by means of a spring 78. The said spring seats on the said pin 72 as well as the adjustable and removable apertured plug 80. The said plug is threadedly received in the bore 82 formed in the said tilting block 17 and an actuation knob may be associated with the arm 76.

Minor changes in shape, size and rearrangement of details may, of course, be resorted to without departing from the spirit of the invention.

That which I claim as new in my invention is:

1. In a device of the nature described a flat hingedly mounted block having a bore therethrough, a collar rotatably mounted through the bore, notches in the periphery of said collar, a scale on the face of the block and indicia on the free edge of the collar cooperating therewith for accuracy of adjustment, means for holding the collar in adjusted position, comprising a second bore in said block, a resiliently biased pin in said bore adapted to engage selective notches thereof, a rod secured to said pin for actuation thereof, a flat base upon which the block is hinged, said block adapted to lie horizontally upon the base, a pintle mounted upon the base, said block being split at its hinged end throughout its width to form jaws to clamp upon said pintle, means for securing said jaws in fixed position upon the pintle, and means in said base for receiving the last means in order that the block may lie flat on the base.

2. In a device of the nature described a flat hingedly mounted block having a bore therethrough, a collar rotatably mounted through the bore, adapted to receive a tool therein, notches about the periphery of said collar, a scale on the face of the block and indicia on the free edge of the collar cooperating therewith for accuracy of adjustment, means for holding the collar in adjusted position, including a resiliently biased pin adapted to engage selective of said notches, a rod secured to said pin for manual actuation thereof, a flat base upon which the block is hinged, said block adapted to lie horizontally upon the base, a pintle mounted upon the base, said block being split at its hinged end throughout its width to form jaws to clamp upon said pintle, and means for securing said jaws in fixed position upon the pintle.

3. In a device of the nature described a flat hingedly mounted block having a bore therethrough, a collar rotatably mounted through the bore, notches in said collar, a scale on the face of the block and indicia on the free edge of the collar cooperating therewith for accuracy of adjustment, means for holding the collar in adjusted position, including a second bore in said block, a resiliently biased pin in said bore and manual means for urging said pin to selective notches in said collar, a flat base upon which the block is hinged, said block adapted to lie horizontally upon the base, and a pintle mounted upon the base, said block being split at its hinged end throughout its width to form jaws to clamp upon said pintle.

4. A tool holder device comprising in combination a base plate adapted for location in a horizontal plane, a block hingedly mounted at one end on said base plate for 180° rotation about the hinge axis above the base plate, said block having opposite flat sides, means to secure the said block in any desired position of rotation about the hinge axis, a bore opening through the block between the opposite flat sides thereof, said opening being located adjacent the upper end thereof, a collar rotatably mounted in said bore opening and means securing the collar selectively in any one of a few predetermined positions of rotation therein, a tool holder having a tubular extension thereon seating within said collar to be rotatable therein and means securing said tool holder to the said collar in any desired position of rotation therein.

ROCCO F. GRIECO.

REFERENCES CITED

The following references are of record in the file of this patent:

UNITED STATES PATENTS

| Number | Name | Date |
|---|---|---|
| 522,155 | Dooley | June 26, 1894 |
| 1,377,884 | Heryngfel et al. | May 10, 1921 |
| 1,385,519 | Calhoun | July 26, 1921 |
| 1,807,999 | McMurtry | June 2, 1931 |
| 1,889,248 | Kilmer | Nov. 29, 1932 |
| 1,915,247 | Holloway et al. | June 20, 1933 |

FOREIGN PATENTS

| Number | Country | Date |
|---|---|---|
| 349,576 | Germany | Mar. 6, 1922 |